(12) United States Patent
Tetyukhin et al.

(10) Patent No.: US 9,458,527 B2
(45) Date of Patent: Oct. 4, 2016

(54) SECONDARY TITANIUM ALLOY AND THE ART OF ITS MANUFACTURE

(75) Inventors: Vladislav Valentinovich Tetyukhin, Moscow (RU); Igor Vasilievich Levin, Verknaya Salda/Sverdlovskaya obl. (RU); Igor Jurievich Puzakov, Verknaya Salda/Sverdlovskaya obl. (RU); Natalia Jurievna Tarenkova, Verknaya Salda/Sverdlovskaya obl. (RU); Natalya Igorevna Levina, legal representative, Verknaya Salda/Sverdlovskaya obl. (RU)

(73) Assignee: VSMPO-AVISMA Corporation (RU)

( * ) Notice: Subject to any disclaimer, the term of this patent is extended or adjusted under 35 U.S.C. 154(b) by 304 days.

(21) Appl. No.: 13/574,437

(22) PCT Filed: Dec. 31, 2010

(86) PCT No.: PCT/RU2010/000816
§ 371 (c)(1),
(2), (4) Date: Mar. 6, 2013

(87) PCT Pub. No.: WO2011/090402
PCT Pub. Date: Jul. 28, 2011

(65) Prior Publication Data
US 2013/0164168 A1    Jun. 27, 2013

(30) Foreign Application Priority Data
Jan. 20, 2010 (RU) ................... 2010101764

(51) Int. Cl.
C22C 14/00 (2006.01)
C22B 34/12 (2006.01)
C22C 1/02 (2006.01)
C22F 1/18 (2006.01)

(52) U.S. Cl.
CPC ........... *C22C 14/00* (2013.01); *C22B 34/1295* (2013.01); *C22C 1/02* (2013.01); *C22F 1/183* (2013.01); *Y02P 10/212* (2015.11)

(58) Field of Classification Search
CPC ... C22B 34/1295; C22F 1/183; C22C 14/00; C22C 1/02
USPC ......................................... 75/10.26; 420/420
See application file for complete search history.

(56) References Cited

U.S. PATENT DOCUMENTS 5,294,267 A    3/1994  Bania et al.
2008/0092997 A1    4/2008  Matsumoto

FOREIGN PATENT DOCUMENTS

| CN | 1888101 | 1/2007 | | |
|---|---|---|---|---|
| CN | 101010438 | 8/2007 | | |
| JP | 2004010963 | 1/2004 | | |
| JP | 2004010963 A | * 1/2004 | ............. | C22C 14/00 |
| JP | 2009-299110 | * 12/2009 | ............. | C22C 14/00 |
| JP | 2009299110 | 12/2009 | | |
| RU | 2169782 | 6/2001 | | |
| RU | 2211873 | 9/2003 | | |
| RU | 2263721 | 6/2005 | | |
| RU | 2256713 | 7/2005 | | |
| RU | 2269584 | 2/2006 | | |
| WO | WO 2009151031 A1 | * 12/2009 | ............. | C22C 14/00 |

OTHER PUBLICATIONS

English translation of International Preliminary Examination Report on Patentability for PCT/RU2010/000816 dated Apr. 5, 2012, 4 pages.
Machine translation of the International Search Report issued in PCT/RU2010/000816 on Jun. 22, 2011, 2 sheets.
Machine translation of the Written Opinion issued in PCT/RU2010/000816 on Jun. 22, 2011, 4 sheets.
Machine translation of Russian Patent No. 2169782 C1, published Jun. 27, 2001, OAO Verkhnesaldinskoe metallurgicheskoe, 4 sheets.
Machine translation of Russian Patent No. 2211873 C2, published Sep. 10, 2003, OAO Verkhnesaldinskoe metallurgicheskoe, 4 sheets.
Machine translation of Russian Patent No. 2263721 C2, published Jun. 10, 2005, Ivanov A.V., 4 sheets.
Mao Xiaonan et al., Relationship study between the component design and quenching degree for BT22 alloy, Rare Metals Letters, No. 6, 2006, pp. 21-26.
English Translation of Chinese Office Action issued for Chinese Patent Application No. 201080064467.2, dated Nov. 13, 2013, 9 pages.
Chinese Office Action issued for Chinese Patent Application No. 201080064467.2, dated Nov. 13, 2013, 7 pages.
The international search report issued in PCT/RU2010/000816 on Jun. 22, 2011, 2 sheets.
International preliminary report on patentability issued in PCT/RU2010/000816 on Sep. 6, 2011, 4 sheets.

\* cited by examiner

*Primary Examiner* — Alexander Polyansky
(74) *Attorney, Agent, or Firm* — Morgan Lewis & Bockius, LLP

(57) ABSTRACT

This invention relates to production of α-, near α- and α+β-titanium alloys from secondary raw materials, which are used mainly in manufacture of sheet material, structural parts and structural armor for defense and civil sectors. This alloy is characterized by the following chemical composition, weight percentage: 0.01-6.5 Al, 0.01-5.5 V, 0.05-2.0 Mo, 0.01-1.5 Cr, 0.1-2.5 Fe, 0.01-0.5 Ni, 0.01-0.5 Zr, 0.01-0.25 Si, oxygen—up to 0.3, carbon—up to 0.1, nitrogen—up to 0.07 and titanium—remainder. Blend is formulated based on the required tensile strength, while content of alloying elements is calculated based on design value of aluminum and molybdenum strength equivalents. The proposed alloy and the art of its manufacture helps to solve a problem of introduction of a wide range of titanium wastes to make a finished product with the required processing and structural behavior.

8 Claims, No Drawings

SECONDARY TITANIUM ALLOY AND THE ART OF ITS MANUFACTURE

CROSS REFERENCE TO RELATED APPLICATION

This application is a U.S. National Stage Entry filing of International Patent Application No. PCT/RU2010/000816, filed 31 Dec. 2010, which in turn claims priority benefit from Russian Patent Application No. 2010101764, filed 20 Jan. 2010, both of which applications are incorporated herein by reference in their entirety.

FIELD OF THE INVENTION

This invention relates to production of α-, near α- and α+β-titanium alloys with controlled mechanical properties, namely rupture strength (tensile strength), from secondary raw materials. These alloys are used mainly in manufacture of sheet material, structural parts and structural armor for defense and civil sectors.

STATE OF THE ART

High cost of titanium and its alloys, titanium sponge in the first place, is a major obstacle to wide application of titanium. Upcoming trend of cost efficiency of titanium alloys lies in introduction of recyclable wastes, which helps to reduce cost of secondary alloys by 30 percent and more while preserving major structural properties inherent to titanium alloys.

It is a known fact that costs relating to procurement of expensive charge materials average up to 90% of all expenses in the prime cost of titanium alloys. Every 10% of introduced wastes help to reduce cost of charge materials by 5-8%. When 10% of wastes are introduced into charge materials per 1ton of melted titanium ingots, we save on average 100 kg of sponge and 10 kg of master alloys. (Titanium, V. A. Garmata et al., M., Metallurgy, 1983 p. 526).

Titanium and its alloys are used to make semi-finished items similar to those made of other commercial metals and alloys (sheet, strip, band, plate, forging, bar, etc). Accordingly all types of conventional wastes (solids, turnings, sheet trimmings) are generated during fabrication of semi-finished items and finished parts of titanium alloys. The total amount of wastes annually generated in the course of manufacture and application of titanium alloys is quite high and equals to about 70% of charge materials used for melting and this figure doesn't vary much with time. (Melting and Casting of Titanium Alloys, A. L. Andreyev, N. F. Anoshkin et al., M., Metallurgy, 1994, pgs. 128-135). Unlike most of the metals, current introduction of titanium recyclable wastes in production is limited.

This invention takes into consideration the fact that titanium alloys are generally produced by alloying of titanium with the following elements (values in parenthesis are the maximum weight percentage concentrations of an alloying element in commercial alloys): Al (8), V (16), Mo (30), Mn (8), Sn (13), Zr (10), Cr (10), Cu (3), Fe (5), W (5), Ni (32), Si (0.5); alloying with Nb (2) and Ta (5) is less common. Variety of titanium alloys and different quantities produced make melting of cheap secondary titanium alloys with controlled strength properties difficult, because it's a common practice to control behavior of titanium alloys, including strength properties by chemistry with narrow ranges of specific alloying elements.

Alloying elements are divided into three groups based on their influence on properties of titanium alloys:
α-staibilizers (Al, O, N and others) which increase α$\leftrightarrows$β transformation temperature and extend the range of solid solutions based on α-titanium;
β-stabilizers—isomorphous (Mo, V, Ni, Ta and others) which decrease α$\leftrightarrows$β transformation temperature and extend the range of solid solutions based on β-titanium; and eutectoid-generating elements (Cr, Mn, Cu and others) which tend to form intermetallic compounds with titanium;
neutral elements (strengtheners) (Zr and Sn) which have no significant influence on beta-transus temperature and do not change phase composition of titanium alloys.

A complex effect of these groups during melting of an alloy with design properties is controlled not only by qualitative and quantitative composition of the groups themselves but also by the mutual influence of these groups.

For complex-alloyed titanium alloys (having considerable weight percentage ranges of alloying elements) the statement that technical result lying in melting of an alloy with design level of strength, ductility and structure is ensured by qualitative and quantitative composition of the alloy and can be "automatically" achieved using similar composition is not correct.

A known prototype titanium-based alloy (JP2006034414A, Sep. 02, 2006) is characterized by the following chemical composition, weight percentage:

| | |
|---|---|
| Aluminum | 1-6.0 |
| Vanadium | 0.1-15.0 |
| Molybdenum | 0.1-11.0 |
| Chromium | 0.1-7.0 |
| Iron | 0.1-4.0 |
| Nickel | 0.1-9.0 |
| Zirconium | 0.1-10.0 |
| Nitrogen, oxygen, carbon | Impurities |
| Titanium | Remainder |

This alloy is a complex-alloyed metal and its properties are controlled by the effect of about 7 alloying elements belonging to three groups which influence polymorphy of titanium. Content of alloying elements in this alloy ranges between 0.1% and 15.0%. This prototype as well as currently known alloys lack the exact quantitative control of titanium alloy chemistry in the course of melting, that is why random combinations of alloying elements with great variations in amounts lead to huge spread in tensile, plastic and structural behavior within the limits for this alloy. Consequently its real engineering application is limited to non-critical parts and is characterized by irrational use of expensive alloying elements. This becomes a critical drawback, since the ratio of the required content of alloying elements in a secondary alloy and their presence in actual wastes come into conflict. That is why the maximum amount of wastes currently introduced into critical alloys does not exceed 30%.

There is a known method of ingot melting which includes charge preparation, i.e. first melting is done in scull furnace with liquid pool forming and subsequent generation of cylindrical ingot-electrode in the mold. After that this ingot-electrode is remelted in vacuum-arc furnace (RF patent No. 2263721, IPC C22B9/20, published Oct. 11, 2005)—prototype. This method enables stable production of quality ingots. Scull melting is used to form liquid pool where metal is maintained at a liquid stage for quite a long time. This facilitates blending of metal chemistry, refining from gas and volatile inclusions, while high-density particles are either dissolved or, having higher density, freeze in the scull and do not become part of the melted ingot. The second melt in VAR furnace results in melting of ingots with a dense, fine-grained and homogeneous structure.

This method has a drawback: melting of complex-alloyed titanium alloys with tightly controlled strength behavior is quite difficult because of unpredictable mix of wastes introduced into the melt which leads to wide spread of mechanical and processing characteristics of material.

DISCLOSURE OF THE INVENTION

The task of this invention is to produce a secondary titanium alloy with controlled strength properties differing from design properties by 10% max. and with the introduction of as much as 100% of recyclable wastes of titanium alloys having arbitrary chemical composition.

A technical result shall be obtaining of a secondary titanium alloy with controlled stable strength and processing behavior while using a wide range of titanium recyclable wastes with different chemistries; saving of expensive chemical elements; increase of process flexibility for secondary titanium alloys.

Such a result for the secondary titanium alloy containing aluminum, vanadium, molybdenum, chromium, iron, nickel, zirconium, nitrogen, oxygen, carbon and titanium and used for production of sheet material, structural parts and structural armor, can be achieved by special addition of silicon with the following weight percentages of the alloy components:

| | |
|---|---|
| Aluminum | 0.01-6.5 |
| Vanadium | 0.01-5.5 |
| Molybdenum | 0.05-2.0 |
| Chromium | 0.01-1.5 |
| Iron | 0.1-2.5 |
| Nickel | 0.01-0.5 |
| Zirconium | 0.01-0.5 |
| Nitrogen | ≤0.07 |
| Oxygen | ≤0.3 |
| Carbon | ≤0.1 |
| Silicon | 0.01-0.25 |
| Titanium | - remainder |

In addition to that values of molybdenum $[Mo]_{equiv.}$ and aluminum $[Al]_{equiv.}^{str.}$ strength equivalents calculated to the formulas:

$$[Al]_{equiv.}^{str.}=Al+Zr/3+20.O+33.N+12.C+3.3.Si, \text{ weight \%}, \quad (1)$$

$$[Mo]_{equiv.}^{str.}=Mo+V/1.7+Ni+Cr/0.8+Fe/0.7, \text{ weight \%}, \quad (2)$$

equal to:
$[Mo]_{equiv.}^{str.}=2.1-5.6$; $[Al]_{equiv.}^{str.}=6.1-8.83$ for sheet material;
$[Mo]_{equiv.}^{str.}=2.1-5.6$; $[Al]_{equiv.}^{str.}=8.84-12.1$ for structural parts; and
$[Mo]_{equiv.}^{str.}=5.7-11$; $[Al]_{equiv.}^{str.}=6.1-12.1$ for structural armor.

The obtained technical result is ensured by the manufacturing process of secondary titanium alloy used for production of sheet material, structural parts and structural armor. This process includes charge preparation, fabrication of consumable electrode followed by the electrode melting in vacuum-arc furnace. Charge is chiefly formulated from recyclable wastes of titanium alloys and mixed based on design value of rupture strength calculated to the following formula:

$$\sigma_B^d=235 \leq 60 \ [Al]_{equiv.}^{str.}+50 \ [Mo]_{equiv.}^{str.} \ [MPa] \quad (3),$$

where
$\sigma_B^d$ is a design value of the alloy rupture strength, while molybdenum $[Mo]_{equiv.}^{str.}$ and aluminum $[Al]_{equiv.}^{str.}$ strength equivalents are calculated based on wastes' chemistry to the following formulas:

$$[Al]_{equiv.}^{str.}=Al+Zr/3+20.O+33.N+12.C+3.3.Si, \text{ weight \%} \quad (1),$$

$$[Mo]_{equiv.}^{str.}=Mo+V/1.7+Ni+Cr/0.8+Fe/0.7, \text{ weight \%} \quad (2),$$

Melting is done to produce alloy to par. 1.

The nature of this invention is based on the feasibility of production of titanium alloys with tightly controlled strength behavior from a huge variety of titanium recyclable wastes having different multicomponent chemistries. Melting of critical alloys with controlled properties requires tight limits on the ranges of alloying elements which inevitably leads to limited introduction of wastes into production of such alloys. The occurred technical discrepancy can be eliminated by a tool which controls the ratio of alloying elements within the claimed alloy in addition to the optimal selection of alloying elements.

The claimed alloy having almost identical molybdenum strength equivalent (based on economical, strength and processing characteristics) for sheet material and structural alloys, is characterized by aluminum strength equivalent which is defined in the range of 6.1 up to 8.83 for sheet material and in the range of 8.84 up to 12.1 for structural alloys. The cause of this limitation lies in the increase of solid-solution alloying as a result of $[Al]_{equiv.}^{str.}$ increase which promotes solid-solution hardening which in its turn deteriorates processing ductility. Aluminum strength equivalent above 8.83 preconditions cracking during rolling.

On the contrary, $[Al]_{equiv.}^{str.}$ within 8.84-12.1 being the most effective strengthening tool in structural alloys maintains the acceptable level of processing characteristics.

Molybdenum equivalent for alloys mostly used for structural armor is much higher and falls within $[Mo]_{equiv.}=5.7-11$. This is because titanium alloys with hardness controlled by alloying have ballistic-proof strength higher and susceptibility to rear spalling lower than those alloys heat treated to produce the same hardness.

For bullet-proof armor application it's expedient to use titanium alloys with α+β-structure after annealing wherein the level of mechanical properties is governed by characteristics of α and β phases, structure heterogeneity and type.

Quenching and hardening treatment deteriorate bullet-proof behavior and promote susceptibility to plug shearing of titanium alloys which is associated with the maximum hardening of α+β titanium alloys and sharp decrease in plastic properties.

Alloy chemistry is selected with due regard to alloying elements available in titanium recyclable wastes.

Group of α-stabilizers.

Aluminum which is used almost in every commercial alloy is the most effective strengthener improving strength and high-temperature behavior of titanium. Conventional content of aluminum in the alloy is between 0.01 and 6.5%. Increase of aluminum above 6.5% leads to undesirable decrease in ductility.

Nitrogen, oxygen and carbon increase allotropic transformation temperature of titanium and are present mostly as impurities in commercial titanium alloys. The impact of these impurities on titanium alloy behavior is so substantial that it should be specifically accounted for during blend formula calculation in order to obtain mechanical properties within the required limits. Presence of nitrogen≤0.07%, oxygen≤0.3% and carbon≤0.1% has no significant effect on decrease of thermal stability, creep strength and impact strength of the alloy.

Group of neutral strengtheners.

Zirconium is being used as alloying element lately. Zirconium forms a wide range of solid solutions with α-titanium, has similar melting point and density and promotes corrosion resistance. Microalloying with zirconium within 0.01-0.5% results in good combination of high strength and ductility in heavy forgings and die-forgings and also in light semi-finished products (bar, sheet, plate) and enables warm and cold working with the upsetting ratio of up to 60%.

Group of β-stabilizers which are widely used in commercial alloys (V, Mo, Cr, Fe, Ni and Si).

Vanadium and iron are β-stabilizing elements which increase alloy strength while maintaining its ductility almost at the unchanged level. Content of vanadium in the claimed alloy as compared with the prototype is moved down in the range of smaller concentrations between 0.01 and 5.5%. That allows introduction of different mixes of titanium wastes. Vanadium content above 5.5% undesirably deteriorates ductility.

When iron content is less than 0.1%, its effect is not sufficient, while increase of its content above 2.5% leads to undesirable decrease of the alloy ductility.

The claimed alloy has a small amount of β-stabilizing chromium which also contributes to the increase of the alloy strength. When chromium content is less than 0.01%, its effect is not sufficient, while its upper limit of 1.5% is preconditioned by chromium content in titanium wastes.

Addition of molybdenum within 0.05-2.0% ensures its full solubility in α-phase, which helps to obtain the required strength behavior without deterioration of plastic properties. When molybdenum exceeds 2.0% specific density of the alloy increases because molybdenum is a heavy metal and this leads to the decrease of plastic properties of the alloy.

The claimed alloy contains nickel addition. Increased content of aluminum and vanadium promotes corrosion and erosion resistance of the alloy in the environment with directed flow of corrosive gas. Presence of nickel also adds to corrosion resistance. When nickel is below 0.01% its effect is not sufficient, while the top limit of 0.5% is determined by nickel content in low quality titanium sponge.

Unlike the prototype, this alloy is added with one more β-stabilizer—silicon which in its claimed limits is fully soluble in a-phase and ensures hardening of α-solid solution and generation of a small amount (up to 5%) of β-phase in the alloy. Moreover, silicon additions increase heat resistance of this alloy.

The prime difference from the prototype lies in the fact that the proposed invention enables to obtain controlled strength characteristics of secondary titanium alloys with high accuracy by flexible selection of amounts of alloying elements based on their presence in wastes of different grades of titanium alloys.

This invention is based on the possibility to divide effects of titanium alloy hardening by alloying with α-stabilizers and neutral strengtheners and by addition of β-stabilizers. This possibility is justified by the following considerations. Elements equivalent to aluminum harden titanium alloys mostly by means of solution strengthening, while β-stabilizers harden titanium alloys by the increase of the amount of stronger β-phase.

Calculation of aluminum strength equivalent was based on the efficiency of the added 1% (wt.) of dissolved α-stabilizers and neutral strengtheners. Silicon additions are also taken into account here because though having little impact on the amount of β-phase, it makes it rather strong. Increase of rupture strength of titanium alloys caused by addition of 1% (wt.) of alloying elements was taken equal to: Al—60, Zr—20, Si—200, O—1250, N—2000 and C—700 MPa/%.

Accordingly, molybdenum strength equivalent was calculated based on the efficiency of the added 1% (wt.) of dissolved β-stabilizers. Increase of rupture strength of titanium alloys caused by addition of 1% (wt.) of alloying elements was taken equal to: Mo—50, V—30, Cr—65, Fe—70 and Ni—50 MPa/%.

Now aluminum and molybdenum strength equivalents can be presented as formulas (1) and (2) correspondingly.

Selection of chemistry of charge materials for ingot melting is based on the required value of rupture strength of the alloy and is defined by the ratio (3). After that molybdenum and aluminum strength equivalents are calculated based on wastes' chemistry, followed by blend formula calculation within $[Al]_{equiv.}^{str.}$ and $[Mo]_{equiv.}^{str.}$ and ingot melting.

Change of the ratio of aluminum and molybdenum strength equivalents facilitates flexible control of strength and processing behavior of the alloy within the limits of its chemical composition.

EXERCISE OF THE INVENTION

Example 1

Items for Structural Application (Plate, Forging, Die-forging)

16 alloys of different chemical compositions were double vacuum-arc melted for trial testing of the claimed alloy (23 kg ingots). Predictable tensile properties in the annealed condition which correspond to tensile properties of the most commonly used structural alloys of Ti-6Al-4V group were used as a basis for blend formula calculations. Ingots were double melted with the introduction of available wastes amounting to 50%. These ingots were subject to forging and rolling to produce 30-32 mm diameter bars. Chemical composition of the alloys is given in Table 1.

TABLE 1

| Chemistry No. | C | N | O | Al | V | Fe | Mo | Ni | Si | Zr | Cr |
|---|---|---|---|---|---|---|---|---|---|---|---|
| 1 | 0.017 | 0.003 | 0.21 | 5.83 | 4.08 | 0.46 | 0.1 | 0.019 | 0.013 | 0.01 | 0.072 |
| 2 | 0.037 | 0.003 | 0.21 | 5.81 | 4.03 | 0.47 | 0.11 | 0.017 | 0.012 | 0.06 | 0.07 |
| 3 | 0.017 | 0.004 | 0.23 | 6.46 | 4.14 | 0.48 | 0.1 | 0.018 | 0.012 | 0.01 | 0.073 |
| 4 | 0.017 | 0.004 | 0.21 | 5.2 | 4.15 | 0.51 | 0.1 | 0.019 | 0.013 | 0.01 | 0.073 |
| 5 | 0.016 | 0.004 | 0.22 | 5.96 | 4.75 | 0.51 | 0.1 | 0.019 | 0.012 | 0.01 | 0.073 |

TABLE 1-continued

| Chemistry No. | C | N | O | Al | V | Fe | Mo | Ni | Si | Zr | Cr |
|---|---|---|---|---|---|---|---|---|---|---|---|
| 6 | 0.017 | 0.004 | 0.22 | 5.82 | 3.58 | 0.49 | 0.1 | 0.019 | 0.011 | 0.01 | 0.072 |
| 7 | 0.015 | 0.004 | 0.22 | 5.82 | 4.04 | 0.81 | 0.1 | 0.019 | 0.012 | 0.01 | 0.069 |
| 8 | 0.015 | 0.004 | 0.186 | 5.84 | 3.98 | 0.2 | 0.11 | 0.017 | 0.0096 | 0.01 | 0.07 |
| 9 | 0.017 | 0.004 | 0.22 | 5.92 | 4.1 | 0.45 | 0.53 | 0.017 | 0.01 | 0.01 | 0.07 |
| 10 | 0.014 | 0.004 | 0.193 | 5.86 | 3.98 | 0.46 | 0.059 | 0.017 | 0.0072 | 0.01 | 0.072 |
| 11 | 0.014 | 0.004 | 0.178 | 6 | 3.87 | 0.56 | 0.097 | 0.016 | 0.01 | 0.01 | 0.15 |
| 12 | 0.016 | 0.004 | 0.22 | 6 | 4.02 | 0.54 | 0.11 | 0.018 | 0.01 | 0.01 | 0.026 |
| 13 | 0.014 | 0.004 | 0.2 | 5.2 | 4.02 | 0.48 | 0.11 | 0.016 | 0.013 | 0.01 | 0.078 |
| 14 | 0.015 | 0.004 | 0.164 | 5.82 | 4.08 | 0.49 | 0.11 | 0.016 | 0.012 | 0.01 | 0.074 |
| 15 | 0.018 | 0.004 | 0.174 | 6.06 | 4.22 | 0.57 | 0.1 | 0.016 | 0.013 | 0.01 | 0.08 |
| 16 | 0.008 | 0.006 | 0.179 | 6.05 | 4.11 | 0.54 | 0.098 | 0.016 | 0.012 | 0.01 | 0.075 |

Bars were tensile tested after annealing (730° C., soaking 1 h., air cooling). Strength equivalents, actual and calculated rupture strength as well as elongation are given in Table 2.

TABLE 2

| Chemistry No. | $[Al]_{equiv.}^{str.}$ | $[Mo]_{equiv.}^{str.}$ | Strength [MPa] Actual $\sigma_B$ | Strength [MPa] Calculated $\sigma_B^C$ | Elongation δ, % | Reduction of area, Ψ, % |
|---|---|---|---|---|---|---|
| 1 | 10.178 | 3.266 | 1002.0 | 1009.0 | 21.1 | 54.3 |
| 2 | 10.613 | 3.257 | 1028.7 | 1034.6 | 21.9 | 55.7 |
| 3 | 11.738 | 3.332 | 1076.3 | 1105.8 | 20.8 | 51.8 |
| 4 | 9.781 | 3.380 | 979.0 | 990.9 | 20.9 | 53.4 |
| 5 | 10.726 | 3.732 | 1002.0 | 1065.2 | 22.0 | 58.6 |
| 6 | 10.595 | 3.015 | 995.0 | 1021.4 | 22.3 | 57.0 |
| 7 | 10.574 | 3.739 | 1015.0 | 1056.4 | 21.6 | 55.5 |
| 8 | 9.906 | 2.841 | 1002.0 | 971.4 | 19.1 | 47.3 |
| 9 | 10.691 | 3.689 | 996.0 | 1060.9 | 21.1 | 55.0 |
| 10 | 10.054 | 3.164 | 976.7 | 996.5 | 20.5 | 56.2 |
| 11 | 9.895 | 3.377 | 969.3 | 997.5 | 20.4 | 56.7 |
| 12 | 10.759 | 3.297 | 1013.3 | 1045.4 | 21.7 | 51.0 |
| 13 | 9.545 | 3.276 | 1013.3 | 971.5 | 21.1 | 51.4 |
| 14 | 9.454 | 3.320 | 971.0 | 968.2 | 21.2 | 50.6 |
| 15 | 9.933 | 3.513 | 984.0 | 1006.6 | 21.1 | 54.7 |
| 16 | 9.966 | 3.397 | 995.7 | 1002.8 | 22.5 | 51.3 |
| Requirements VT6ch (BT6ч) (bars) | | | 900–1050 | | ≥10 | ≥30 |

As shown in Table 2, the developed cost-effective alloy is characterized by the level of strength, elongation and reduction of area similar to that of Ti-6Al-4V alloy.

Example 2

Sheet Material

Several chemical compositions based on the available wastes were selected for design strength values. Alloys were double melted: one melt—in vacuum arc scull furnace, the second—in vacuum arc furnace, then subjected to rolling to 2 mm thick sheet with subsequent annealing.

The required strength values for three different applications equaled to 860, 880 and 980 MPa correspondingly.

Charge was formulated to the above scheme; the results are given in Table 3.

TABLE 3

| Chemistry No. | Required strength level, MPa | Selected equivalents | Mix of charge materials maintaining the required ratio of equivalents |
|---|---|---|---|
| 1 | 860 | $[Al]_{equiv.}^{str.} = 7.72$ $[Mo]_{equiv.}^{str.} = 3.28$ | Titanium sponge, TG-90 30.4% Wastes of Ti—6Al—4V alloy 45.6% Wastes of Ti—10V—2Fe—3Al alloy 22.8% Wastes of VST5553 alloy 0.9% Al 0.2% |
| 2 | 880 | $[Al]_{equiv.}^{str.} = 7.94$ $[Mo]_{equiv.}^{str.} = 3.38$ | Titanium sponge TG-90 35.9% Wastes of Ti—6Al—4V alloy 36.0% Wastes of Ti—10V—2Fe—3Al alloy 26.9% Wastes of VST5553 alloy 1.1% Al 0.3% |
| 3 | 980 | $[Al]_{equiv.}^{str.} = 8.28$ $[Mo]_{equiv.}^{str.} = 4.5$ | Titanium sponge TG-TV 48.3% Wastes of Ti—6Al—4V alloy 43.3% Wastes of Ti—10V—2Fe—3Al alloy 3.6% Wastes of VST5553 alloy 1.4% Master alloy V—Al 2.8% Al 0.4% |

Alloy chemistry is given in Table 4.

TABLE 4

| Chemistry No. | C | N | O | Al | V | Fe | Mo | Ni | Si | Zr | Cr |
|---|---|---|---|---|---|---|---|---|---|---|---|
| 1 | 0.014 | 0.006 | 0.17 | 3.9 | 4.1 | 0.6 | 0.07 | 0.02 | 0.015 | 0.02 | 0.05 |
| 2 | 0.015 | 0.012 | 0.19 | 3.5 | 4.1 | 0.5 | 0.06 | 0.015 | 0.013 | 0.05 | 0.14 |
| 3 | 0.013 | 0.006 | 0.2 | 4.2 | 4.3 | 1.1 | 0.08 | 0.07 | 0.012 | 0.05 | 0.20 |

Mechanical properties of the obtained samples are given in Table 5.

TABLE 5

| Tensile strength, $\sigma_B$, MPa | Yield strength, $\sigma_{0.2}$, MPa | Elongation, δ, % | Reduction of area, Ψ, % |
| --- | --- | --- | --- |
| 871.5 | 824.0 | 23.8 | 57.9 |
| 890.1 | 838.2 | 24.5 | 56.2 |
| 975.2 | 906.1 | 21.7 | 54.5 |

Example 3

Structural Armor (Hinged Armor Plates for Vehicle Protection)

Trial ingots weighing 23 kg each were melted to produce sheet material for armor application. Ingots were produced by double melting. The following materials were used as charge materials for ingot melting: titanium sponge of TG-TV grade, wastes of VST5553 alloy, wastes of Ti-10V-2Fe-3Al alloy. Ratio of charge materials used for ingot melting is given in Table 6.

TABLE 6

| Chemistry No. | Required strength level, MPa | Selected equivalents | Mix of charge materials maintaining the required ratio of equivalents |
| --- | --- | --- | --- |
| 1 | 1160 | $[Mo]_{equiv.}^{str.}$ = 8.6<br>$[Al]_{equiv.}^{str.}$ = 8.3 | Titanium sponge TG-TV 35%<br>Wastes of VST5553 alloy 40%<br>Wastes of Ti—10V—2Fe—3Al alloy 25% |
| 2 | 1060 | $[Mo]_{equiv.}^{str.}$ = 5.7<br>$[Al]_{equiv.}^{str.}$ = 9.3 | Titanium sponge TG-TV 60%<br>Wastes of VST5553 alloy 10%<br>Wastes of Ti—10V—2Fe—3Al alloy 30% |

Alloy chemistry is given in Table 7.

TABLE 7

| Chemistry No. | Weight percentage of elements, % | | | | | | | | | | |
| --- | --- | --- | --- | --- | --- | --- | --- | --- | --- | --- | --- |
| | C | N | O | Al | V | Fe | Mo | Ni | Si | Cr | Zr |
| 1 | 0.013 | 0.012 | 0.21 | 3.5 | 4.11 | 1.16 | 2.0 | 0.70 | 0.024 | 1.42 | 0.015 |
| 2 | 0.015 | 0.008 | 0.24 | 4.0 | 3.55 | 1.74 | 0.39 | 0.11 | 0.026 | 0.50 | 0.020 |

Mechanical properties of alloys No. 1 and No. 2 tested on 6 mm thick sheet are given in Table 8.

TABLE 8

| Chemistry No. | Tensile strength, $\sigma_B$, MPa | Yield strength, $\sigma_{0.2}$, MPa | Yield strength, $\sigma_{0.2}$, MPa | Tensile strength, $\sigma_B$, MPa | Elongation, δ % | Reduction of area, Ψ, % | KCU kgf * m/sm² |
| --- | --- | --- | --- | --- | --- | --- | --- |
| 1 | 1147 | 1077 | 1077 | 1147 | 16.19 | 48.32 | 5.2 |
| 2 | 1068 | 1012 | 1012 | 1068 | 15.19 | 44.02 | 5.7 |

As seen from the above examples, fabrication of cheap secondary alloys against this invention helps to solve the problem of introduction of a wide range of titanium alloy recyclable wastes into production with the finished product characterized by design processing and structural behavior. Therefore, this invention provides for high efficiency of the industrial use.

It should be noted that this disclosure contains only those aspects of the invention that are necessary for its clear understanding. Some aspects that are obvious to the addressees in this art and thus of no assistance in comprehension of this invention were not disclosed herein in order to abbreviate a disclosure. Despite the fact that several embodiment options for this invention were disclosed herein, it would become clear for an addressee after the study of this disclosure that there could be plenty of modifications and amendments hereto. All such modifications and amendments to this invention shall be considered fallen within the scope of the above disclosure and the appended claim.

The invention claimed is:

1. A secondary titanium alloy for manufacturing sheet material, and structural parts, the secondary titanium alloy consists of:
(a) aluminum, vanadium, molybdenum, chromium, iron, nickel, zirconium, nitrogen, oxygen, carbon and titanium; and
(b) silicon,
wherein weight percentages (wt. %) of components of the secondary titanium alloy consist of:

| aluminum | 0.01-6.5 |
| --- | --- |
| vanadium | 0.01-5.5 |
| molybdenum | 0.05-2.0 |
| chromium | 0.01-1.5 |
| iron | 0.1-2.5 |
| nickel | 0.01-0.5 |
| zirconium | 0.01-0.5 |
| nitrogen | ≤0.07 |
| oxygen | ≤0.3 |
| carbon | ≤0.1 |
| silicon | 0.01-0.25 |
| titanium | - remainder, | the secondary titanium alloy having a design value of ultimate tensile strength which is calculated according to the formula:

$$\sigma_B^d - 235 < 60[Al]_{equiv.}^{str.} + 50[Mo]_{equiv.}^{str.} [MPa],$$

where $\sigma_B^d$ is the design value of the ultimate tensile strength of the secondary titanium alloy, $[Mo]_{equiv.}^{str.}$ is molybdenum strength equivalent and $[Al]_{equiv.}^{str.}$ is aluminum strength equivalent, the aluminum strength equivalent and the molybdenum strength equivalent have values that are calculated respectively from formulas (1) and (2) based on chemical composition of recyclable wastes of titanium alloys from which the secondary titanium alloy is made:

$$[Al]_{equiv.}^{str.} = Al + Zr/3 + 20 \cdot O + 33 \cdot N + 12 \cdot C + 3.3 \cdot Si, \text{ weight \%}, \quad (1)$$

$$[Mo]_{equiv.}^{str.} = Mo + V/1.7 + Ni + Cr/0.8 + Fe/0.7, \text{ weight \%}, \quad (2).$$

2. The secondary titanium alloy of claim 1, wherein for the sheet material, the molybdenum strength equivalent, $[Mo]_{equiv.}^{str.}$, and the aluminum strength equivalent, $[Al]_{equiv.}^{str.}$, have the following range of values:

$[Mo]_{equiv.}^{str.}$=2.1-5.6; and $[Al]_{equiv.}^{str.}$=6.1-8.83.

3. The secondary titanium alloy of claim 1, wherein for the structural parts, the molybdenum strength equivalent, $[Mo]_{equiv.}^{str.}$, and the aluminum strength equivalent, $[Al]_{equiv.}^{str.}$, have the following range of values:

$[Mo]_{equiv.}^{str.}$=2.1-5.6; and $[Al]_{equiv.}^{str.}$=8.84-12.1.

4. The secondary titanium alloy of claim 1, wherein for the structural parts, the molybdenum strength equivalent, $[Mo]_{equiv.}^{str.}$, and the aluminum strength equivalent, $[Al]_{equiv.}^{str.}$, have the following range of values:

$[Mo]_{equiv.}^{str.}$=5.7-11; and $[Al]_{equiv.}^{str.}$=6.1-12,1 wherein the structural parts comprise structural armor.

5. A secondary titanium alloy comprising alloy elements of alpha stabilizers, beta stabilizers, neutral stabilizers and remainder titanium, wherein weight percentages (wt. %) of components of the secondary titanium alloy consist of:

| | |
|---|---|
| aluminum | 0.01-6.5 |
| vanadium | 0.01-5.5 |
| molybdenum | 0.05-2.0 |
| chromium | 0.01-1.5 |
| iron | 0.1-2.5 |
| nickel | 0.01-0.5 |
| zirconium | 0.01-0.5 |
| nitrogen | ≤0.07 |
| oxygen | ≤0.3 |
| carbon | ≤0.1 |
| silicon | 0.01-0.25 |
| titanium | - remainder, | said secondary titanium alloy being characterized by alloy elements which strengthen the secondary titanium alloy by solid solution strengthening according to aluminum strength equivalent $[Al]_{equiv.}^{str.}$, wherein $[Al]_{equiv.}^{str.}$ is defined by $[Al]_{equiv.}^{str.}$=Al+Zr/3+20·O+33·N+12·C+3.3·Si, weight %, wherein $[Al]_{equiv.}^{str.}$ ranges from 6.1 to 12.1;

wherein said secondary titanium alloy further being characterized by alloy elements which contribute to a beta phase according to molybdenum strength equivalent, $[Mo]_{equiv.}^{str.}$, wherein $[Mo]_{equiv.}^{str.}$ is defined by $[Mo]_{equiv.}^{str.}$=Mo+V/1.7+Ni+Cr/0.8+Fe/0.7, weight %, (2)

wherein $[Mo]_{equiv.}^{str.}$ ranges from 2.11 to 11.

6. The secondary titanium alloy according to claim 5, wherein $[Mo]_{equiv.}^{str.}$ ranges from 2.1 to 5.6 and $[Al]_{equiv.}^{str.}$ ranges from 6.1-8.83 for a sheet material.

7. The secondary titanium alloy according to claim 5, wherein $[Mo]_{equiv.}^{str.}$ ranges from 2.1 to 5.6 and $[Al]_{equiv.}^{str.}$ ranges from 8.84 to 12.1 for a structural part.

8. The secondary titanium alloy according to claim 5, wherein $[Mo]_{equiv.}^{str.}$ ranges from 5.7-11 and $[Al]_{equiv.}^{str.}$ ranges from 6.1-12.1 for a structural armor.

* * * * *